April 14, 1936.  J. E. OTT  2,037,039
APPARATUS FOR BALING PAPER PULP
Filed Jan. 23, 1932  4 Sheets-Sheet 1
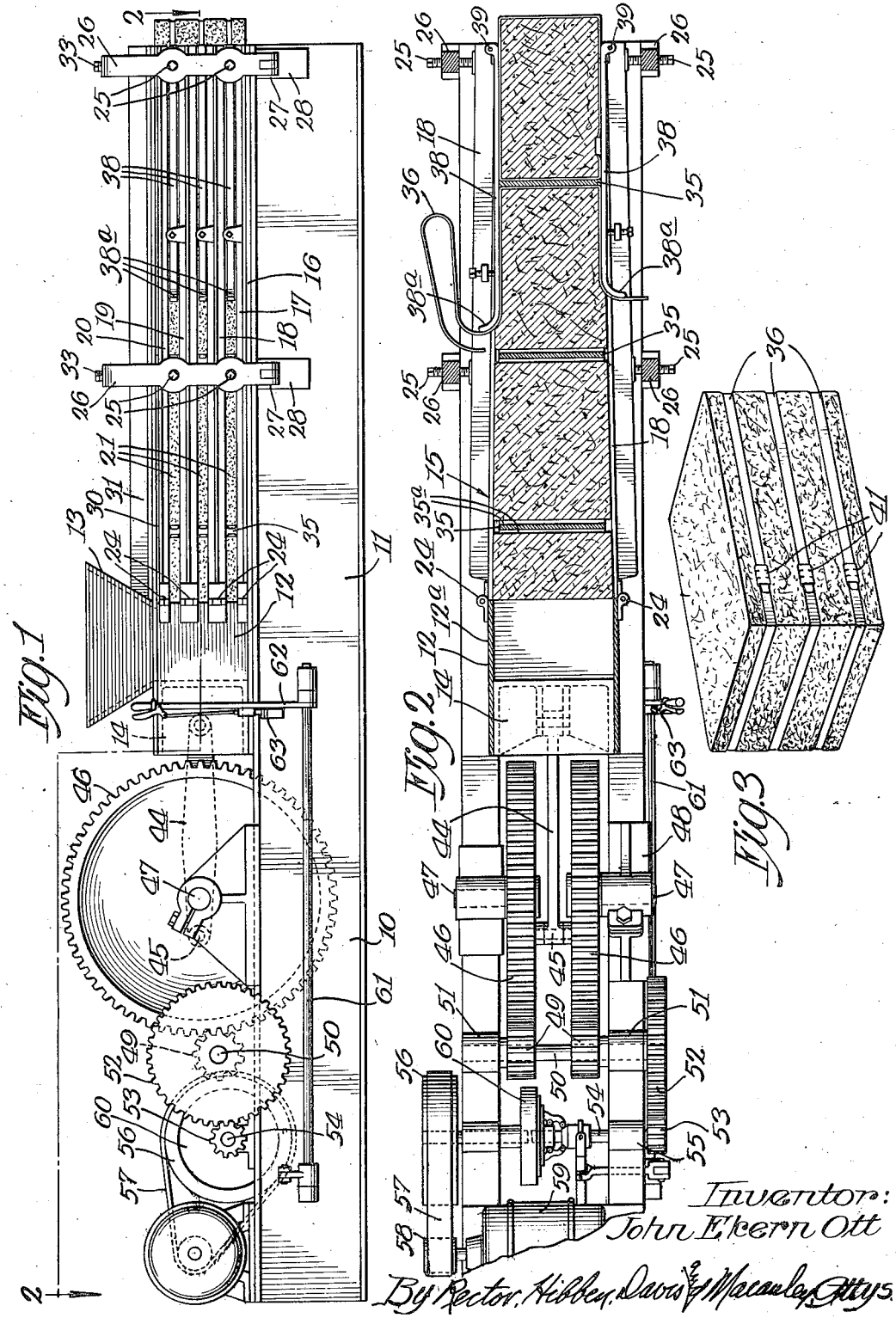
Inventor:
John E. Kern Ott
By Rector, Hibben, Davis & Macauley Attys.

April 14, 1936.  J. E. OTT  2,037,039
APPARATUS FOR BALING PAPER PULP
Filed Jan. 23, 1932  4 Sheets-Sheet 2
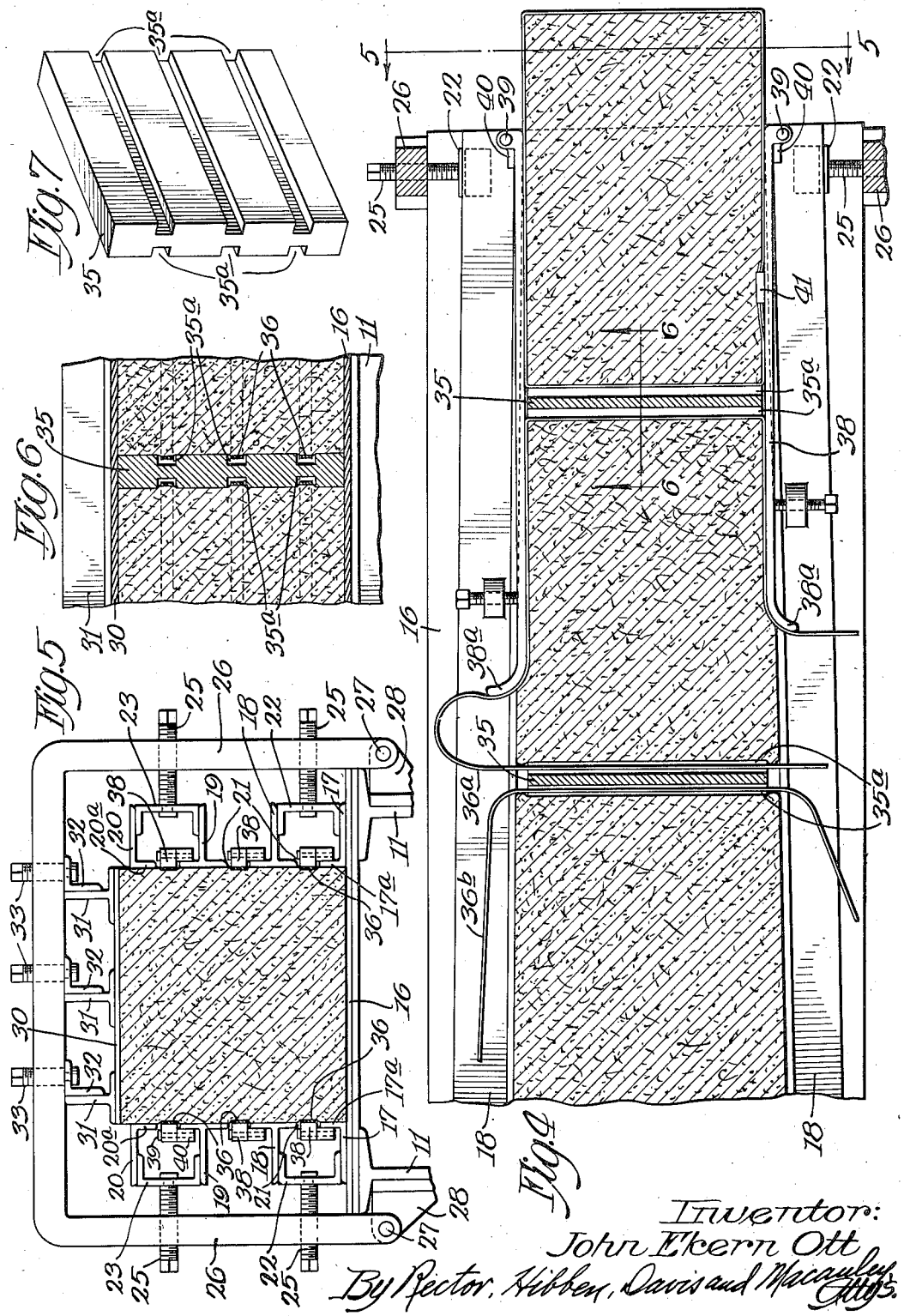
Inventor:
John Ekern Ott
By Rector, Hibben, Davis and Macauley
Attys.

April 14, 1936.  J. E. OTT  2,037,039
APPARATUS FOR BALING PAPER PULP
Filed Jan. 23, 1932   4 Sheets-Sheet 3
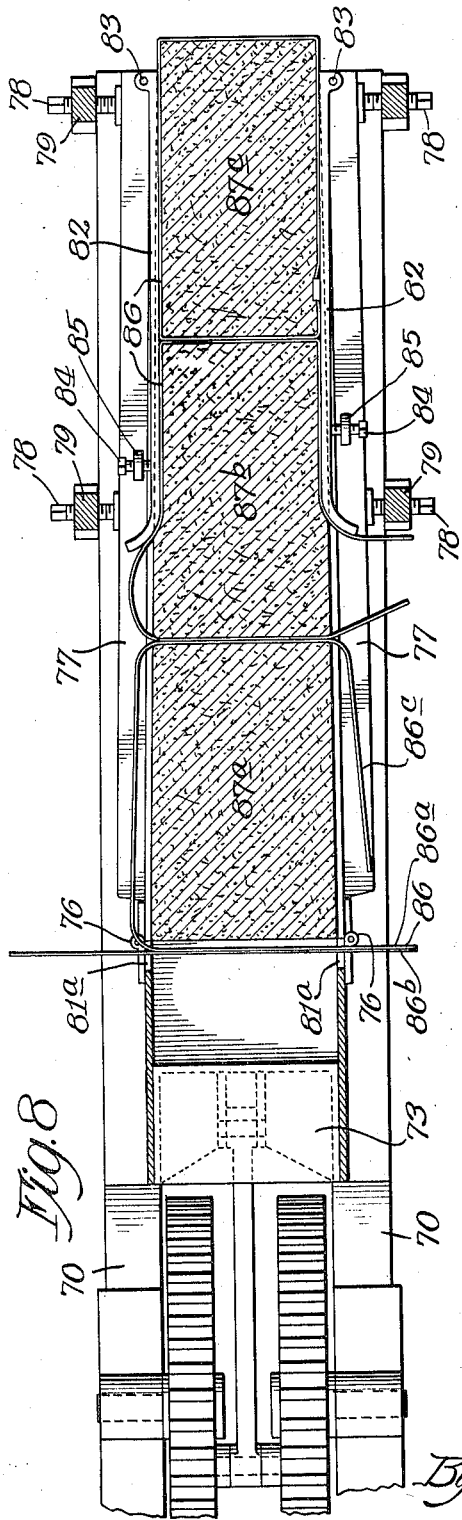
Inventor
John E. kern Ott
By Rector, Hibben, Davis & Macauley
Attys.

April 14, 1936.  J. E. OTT  2,037,039
APPARATUS FOR BALING PAPER PULP
Filed Jan. 23, 1932  4 Sheets-Sheet 4
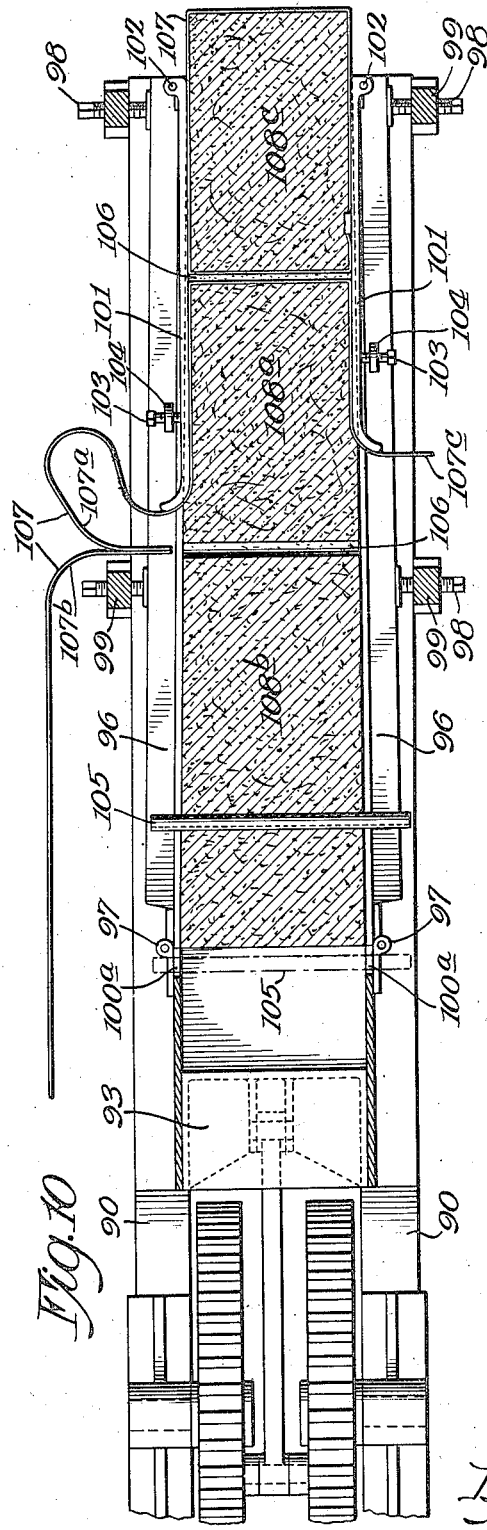
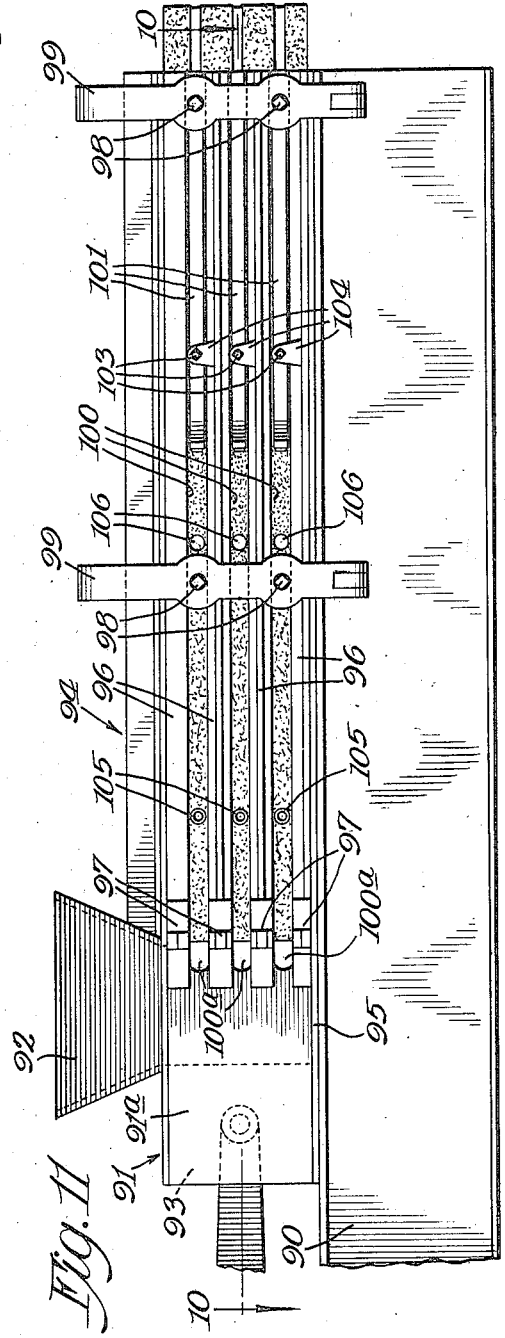
Inventor:
John Ekern Ott
By Rector, Hibben, Davis & Macauley
Attys.

Patented Apr. 14, 1936

2,037,039

UNITED STATES PATENT OFFICE 2,037,039

APPARATUS FOR BALING PAPER PULP

John Ekern Ott, Chicago, Ill., assignor to Acme Steel Company, Chicago, Ill., a corporation of Illinois Application January 23, 1932, Serial No. 588,318

1 Claim. (Cl. 100—20)

This invention relates to an improved apparatus for baling paper pulp and its purpose is to provide an improved means for baling paper pulp, such as shredded pulp, and securing a flexible metallic binder around it during the baling process.

Baling machines have heretofore been used for baling paper pulp and other commodities but these machines have presented a difficulty in the matter of passing binders around the bales and the result has been that the baling of paper pulp and the like has been a rather slow and laborious process. The principal object of the present invention is to provide an improved apparatus for baling according to which one or more flexible metallic binders, such as sheet metal straps, may be conveniently passed around the individual bales during the process of baling with the free ends of the straps in convenient position for securing them together by means of seals, spot welds and the like. A further object of the invention is to provide improved means for automatically stretching the flexible binders taut around the individual bales as the bales travel through the baling apparatus. A further object of the invention is to provide an improved baling apparatus comprising a chute through which the bales travel and having friction shoes mounted along the walls of the chute for engaging and drawing taut a flexible binder which is put into position to be passed around the bale as it moves through the apparatus. Other objects relate to various features of construction and arrangement which will appear more fully hereinafter.

The nature of the invention will be understood from the following specification taken with the accompanying drawings, in which several examples of the method are set forth in connection with one form of the improved apparatus. In the drawings, Fig. 1 shows a side elevation of the improved baling apparatus;

Fig. 2 shows a sectional view taken on the line 2—2 of Fig. 1;

Fig. 3 is a perspective view of the completed bale after the straps have been drawn taut around it and sealed at their ends;

Fig. 4 is a horizontal section similar to that of Fig. 2, on an enlarged scale, showing the right hand portion of the apparatus with binding straps being threaded through grooves in the separating plate preliminary to fastening the two ends of the strap together around separate units of the pulp;

Fig. 5 is an enlarged vertical section taken on the line 5—5 of Fig. 4;

Fig. 6 is a longitudinal detail section taken on the line 6—6 of Fig. 4, showing the means for separating adjacent bales;

Fig. 7 is a perspective view of one of the separating plates employed between adjacent bales;

Fig. 8 is a horizontal section similar to that of Fig. 2, taken on the line 8—8 of Fig. 9, showing a modified form of the invention in which the straps are inserted through the pulp while it is still in a loose condition in the hopper;

Fig. 9 is a side elevation of the apparatus shown in Fig. 8;

Fig. 10 is a horizontal section similar to that of Fig. 2 taken on the line 10—10 of Fig. 11, showing a third form of the apparatus embodying the present invention and capable of being used in practicing the improved method; and Fig. 11 is a side elevation of the form of apparatus shown in Fig. 10.

As illustrated in the drawings, the machine comprises a frame 10 having two longitudinal I-beams 11 which are adapted to rest upon a floor or other support and which are adapted to carry the casing 12 into which the sheet pulp, or other commodity to be baled, is fed through a hopper 13. The casing 12 is rectangular in cross-section and one end thereof is fitted by a sliding plunger or piston 14 which is adapted to engage the paper pulp as it falls through the hopper 13 and force it rearwardly into the chute which is designated generally by the numeral 15.

The chute 15 comprises a flat bottom plate 16 which rests upon and is secured to the upper flanges of the I-beams 11. The side walls of the chute are formed by two series of longitudinal beams which are spaced apart as shown particularly in Figs. 1 and 5. At each side of the chute, there is an angle beam 17 mounted to slide over the bottom plate 16 with its flange directed upwardly as shown at 17a. The upper edge of this flange is spaced from the lower flange of a T-beam 18 which has its web extending outwardly and its flanges directed upwardly and downwardly therefrom in line with the flange 17a. Another T-beam 19 is spaced upwardly from the T-beam 18 and the beam 19 is spaced downwardly from the depending flange 20a of an angle beam 20 which forms the top member of the side wall. The spacing apart of these beams thus forms three slots 21 in the side wall. The lower T-beam 18 is connected to the lower angle beam 17 by brackets 22 and the upper T-beam 19 is connected to the upper angle beam 20 by brackets 23. The beams forming each side wall of the chute are connected together at their forward ends and they are pivotally connected to the side walls 12ᵃ of the casing 12 by hinges 24. This hinged mounting of the side walls of the chute permits them to be adjusted so that they will have a greater or less degree of convergence toward the rear end of the machine.

The adjustment of the side walls of the chute is effected by screw threaded adjusting members 25 about which pass through threaded apertures in the side walls of yokes 26 and engage the brackets 22 and 23 which are connected to the spaced angle beams and T-beams of the side walls. The brackets 22 and 23 are engaged by portions of the adjusting members 25 of reduced diameter so that the side wall members of the chute may be turned positively in either direction by the turning of the adjusting members. The yokes 26 are pivoted at 27 on brackets 28 which are secured to the I-beams 11 of the frame.

The top wall of the chute 15 is formed by a plate 30 which is secured to the lower flanges of a series of spaced T-beams 31. These T-beams have angle plates 32 secured thereto and these angle plates are threadedly engaged by adjusting members 33 which pass through threaded apertures in the upper cross members of the yokes 26. The top plate 30 is thus carried by the adjusting members 33 which may be manipulated to vary the spaced relation of the top wall of the chute with respect to the bottom plate 16 for the purpose of varying the cross-section of the bale. By suitably adjusting the members 33 which engage the different yokes 26, the top plate 30 may be caused to have an inclination downwardly toward the rear of the machine for the purpose of compressing the bales as they move rearwardly.

As the paper pulp or the like is fed into the casing 12 through the hopper 13, the reciprocating piston 14 compresses it and at the same time forces it rearwardly into the chute 15. After a quantity of paper pulp has been fed into the chute, a vertical separating plate 35 is inserted downwardly through the hopper 13 into the casing 12, at the rear end of the casing, to form a division between two adjacent bales. The feeding of the paper pulp and the compression thereof by the piston 14 is then allowed to continue until a sufficient quantity of paper pulp has been inserted to form another bale and then another separating plate 35 is inserted and this plate is forced rearwardly by a continuation of the compressing action so that finally the chute is occupied by several units of paper pulp each of which is adapted to form one bale and each of which is separated from the paper pulp of the neighboring bale by one of the separating plates 35. The plates 35 are provided on opposite sides with transverse grooves 35ᵃ which are so arranged that the grooves on opposite sides of each plate register with each other and also with the slots 21 which are formed between the beams constituting the side walls of the chute.

In order to bind the paper pulp of each unit into a bale, flexible binders, such as flat metal straps 36, are passed transversely through the slots 35ᵃ of the separating plates as these plates move rearwardly through the chute 15. Three such straps are passed through the slots 35ᵃ on the forward side of each plate 35 with a considerable amount of strapping extending on opposite sides of the chute and then, as the contents of the chute move rearwardly, the straps are adapted to be drawn about the unit of paper pulp which is to form one bale. This drawing of the straps around the paper pulp is effected by means of friction plates or shoes 38 which are pivoted at the rear end of the apparatus, as shown at 39, on brackets 40 which are secured to the beams forming the side walls of the chute. The friction shoes 38 extend forwardly and have their forward ends curved outwardly, as shown at 38ᵃ. The shoes on the side of the machine opposite the position of the operator are preferably longer than those on the side adjacent the operator, as shown in Fig. 2. As the unit of paper pulp passes rearwardly through the chute, the friction plates 38 engage the straps 36 and cause these straps to be drawn taut around substantially three sides of the unit of paper pulp until the parts occupy the position illustrated in Fig. 2. There are then free ends of the straps 36 on the side of the machine opposite that occupied by the operator and these free ends are inserted through the grooves 35ᵃ on the rear side of the next separating plate 35, as shown in Fig. 4. The free ends of the strap on the front side of the machine are then brought together and stretched taut by the operator, and then the free ends of the strap are secured together by any suitable fastening means, such as seals 41, which may be the form of seals described and claimed in the United States patent of Ralph H. Norton No. 1,260,016, dated March 19, 1918. When the seals are thus secured, the unit of paper pulp between the two separating plates 35 is bound in a bale and it continues its travel in the chute until it is discharged from the rear end thereof. The compression brought about by the convergence of the chute and by the action of the reciprocating piston 14, is such that when the bound bale is released from the chute, it tends to expand and thus the encircling binding straps 36 are drawn more tautly around it. At the same time that the free ends 36ᵃ of the three straps 36 are inserted through the grooves in the rear side of the oncoming separating plate, as shown in Fig. 4, three other straps 36ᵇ are inserted through the grooves on the forward side of the same separating plate in preparation for the binding of the next unit of pulp so that, as the pulp moves rearwardly through the chute, the rear portions of these straps 36ᵇ are carried between the friction plates 38 so that they are drawn taut around the rear portion of the next unit of pulp. In this way, successive sections of straps 36 are inserted through the pulp and drawn taut and bound around successive units thereof. The insertion of the straps through the moving column of pulp at the ends of successive bale units and the fastening of these straps to complete the bales is accomplished while the pulp is in intermittent motion through the chute under the influence of the plunger 14 so that the operation of baling is carried on very rapidly.

For the purpose of actuating the reciprocating plunger 14, it is connected by a piston rod 44 to a crank pin 45 mounted in an eccentric position between two large gears 46. These gears are secured on a shaft 47 which is journaled in bearings 48 carried by the I-beams 11 and they are driven by pinions 49 which are secured on a shaft 50 journaled in bearings 51. The projecting end of this shaft has a gear 52 secured thereon and this gear is in turn driven by a pinion 53 fixed on the end of a shaft 54. The shaft 54 is journaled in bearings 55 carried by the I-beams 11 and it has a flywheel pulley 56 secured thereon at one side of the machine. This pulley is driven by a belt 57 passing around the pulley 58 fixed on the shaft of an electric motor 59. The train of mechanism which has just been described may have a friction clutch 60 connected therein and controlled by a shaft 61 which extends along the I-beam 11 at the front side of the machine with an operating lever 62 secured thereon adjacent the hopper 13. This lever may be locked in position by means of a detent engaging a quadrant 63 and thus the operator is enabled to control the starting and stopping of the reciprocating plunger or piston 14 from a position adjacent the hopper, without stopping the motor. This may be of advantage, for example, in arresting the operation of the piston at the times when the separating plates 35 are inserted into the casing.

In Figs. 8 and 9 there is illustrated a modified form of the apparatus of the present invention which may be used in practicing the improved method in a modified way according to which the use of separating plates is avoided and the straps are inserted through the pulp while it is in a more or less loose condition in the hopper in which it is initially placed. This modified form of apparatus comprises longitudinal supporting beams 70 upon which is mounted a casing 71 adapted to receive the loose pulp through a hopper 72 and having mounted therein a reciprocating plunger 73 which is operated by mechanism similar to that previously described. The casing 71 has a lower wall 74 which extends rearwardly and forms the bottom wall of the chute 75 through which the pulp moves rearwardly in a compacted state. The side walls 71ª of the casing are connected at their rear ends by hinges 76 to beams or side members 77 which extend rearwardly to form the side walls of the chute 75. These side members are engaged by adjusting screws 78 which pass through the supporting yokes 79 so that the side walls of the chute may be made to converge rearwardly for the purpose of gradually increasing the pressure upon the pulp as it advances through the chute. The yokes 79 also serve as supports for the top wall 80 of the chute, as in the form of the invention previously described. In the rear portions of the slots 81 which are thus formed between adjacent side members 77, there are mounted friction shoes 82 which are pivoted at their rear ends as shown at 83 and which are adjustable inwardly at their forward ends by means of adjusting screws 84 engaging the lugs 85 carried by the side members.

In the form of apparatus shown in Figs. 8 and 9, the side walls 71ª of the casing are slotted between the hinges 76 to form continuations 81ª of the slots 81 which are formed between the side members of the chute and the flexible metal straps 86 which are to be employed in binding successive units of the pulp are inserted transversely through these slots and through the paper pulp in the casing while this pulp is still in a more or less loose state, thus making it unnecessary to use separating plates to form channels for receiving the strips when the pulp has moved rearwardly in the chute. According to this modification of the method, two straps are inserted transversely through the casing through each pair of aligning slots 81ª, these straps including the free end 86ª of one strap which has previously been passed partially around a unit 87ª of the pulp, and another strap 86ᵇ which is to be passed around the next following unit of pulp to be formed by the reciprocating action of the plunger 73. When the ends 86ª of three straps have been passed through the pulp in the casing, these three ends will then project from the casing adjacent to other end portions 86ᶜ of the same straps which have previously been passed through the pulp at the rear end of the unit 87ª when the rear end of that unit is about to be formed in the casing 71. These free ends of the straps which then occupy positions on the side of the machine on which the operator is located may then be drawn taut and secured together by seals but this is preferably not done until the unit of pulp reaches the position 87ᵇ wherein the rear portion of the unit will have been engaged by the friction shoes 82 so that the shoes will have drawn the major portions of these straps taut around the major portion of the unit. The projecting ends of the strap are then drawn taut and secured together by sealing, spot welding and the like, with the result that a complete bound unit is formed which passes rearwardly and has the form of the unit which is shown at 87ᶜ. This unit 87ᶜ is ultimately projected from the chute in the form of a complete bound bale.

In Figs. 10 and 11 of the drawings there is illustrated a third form of apparatus comprising still another means for permitting the insertion of the straps between successive units of the pulp. In this form, the two supporting beams 90 have mounted thereon a casing 91 into which the paper pulp is introduced through a hopper 92. A reciprocating plunger 93 is driven by mechanism similar to that previously described to compact the pulp and move it rearwardly through a chute 94. The lower wall 95 of the casing is extended rearwardly to form the lower wall of the chute and the side walls of the chute are formed by bars or side members 96 which are connected at their forward ends to the side walls 91ª of the casing by means of hinges 97. The side bars 96 are connected to adjusting screws 98 which are mounted in the supporting yokes 99 carried by the beams 90 so that the side bars may be made to converge rearwardly toward the rear end of the chute. The side bars 96 are spaced apart to form slots 100 in the rear ends of which are mounted the friction shoes 101. These shoes are pivotally supported at their rear ends as shown at 102 and their forward portions are engaged by adjusting screws 103 passing through lugs 104 carried by the side bars so that the pressure of these shoes upon the sides of the column of pulp may be varied as desired. The side walls 91ª of the casing are slotted as shown at 100ª to form continuations of the slots which are formed between the side bars of the chute and these slots 100ª are adapted to permit the insertion through the casing and through the loose pulp therein of a plurality of tubes 105 which are of sufficient length to project on opposite sides and from opposite sides of the chute as the pulp passes rearwardly. The tubes 105 are placed one above the other in the slots 100ª and as the pulp is fed into the casing and compacted by the plunger 93, these tubes are moved rearwardly until they ultimately occupy positions in the compacted pulp in the chute. During the rearward travel of the pulp, the ends of these tubes are engaged by the operator and they are withdrawn from the pulp, leaving a series of holes 106 through which flexible binding straps 107 may be inserted. Through each hole 106, there is inserted the free end 107ª of a binding strap which then partially surrounds a unit 108ª of pulp in the chute and also the end 107ᵇ of another length of strap which is ultimately to be passed around the next following unit 108ᵇ of the body of pulp. When these straps have been inserted through the holes 106, each free end 107a of one strap will occupy a position on the front side of the machine adjacent to the other end 107c of the same strap and this strap will have been drawn taut around a major portion of the unit 108a of the pulp by the action of the friction shoes 101 in engaging the strap as it passes rearwardly. When these two free ends of each strap are thus projected on the front side of the machine, they are further drawn taut around the unit 108a of the pulp, and the ends are secured together by spot welding, seals or the like so that a complete unit is formed which has the appearance of the unit 108c. This bound unit is pushed rearwardly through the chute and ultimately emerges from the rear end thereof. The straps 107b which are inserted through the holes 106 at the same time that the free ends 107a are so inserted, are carried rearwardly with the body of pulp and are ultimately pressed around the sides of the unit 108b by the action of the friction shoes 101.

Although several forms of the improved apparatus have been illustrated and described in connection with certain examples of the improved method of baling, it will be understood that the apparatus may be constructed in various forms, and that the method may be practiced in various ways, within the scope of the appended claim.

I claim:

The combination in baling apparatus for paper pulp, of a casing adapted to receive said pulp, a chute adapted to receive said pulp from said casing, means adapted to engage said pulp in said casing for compressing it and advancing it along said chute, said chute having longitudinal slots in its side walls for permitting a flexible binder to be inserted transversely through the pulp in said chute, friction plates pivoted on said chute in registry with said slots to engage said binder and draw it taut along the sides of said pulp during its travel, and means for adjusting said friction plates about their pivots to vary the pressure with which they engage said binder.

JOHN EKERN OTT.